Feb. 12, 1952   D. W. MOORE   2,585,487

TOOLHOLDER

Filed April 25, 1950

INVENTOR.
Dwight W. Moore
BY
Webb, Mackey & Binden.
HIS ATTORNEYS

Patented Feb. 12, 1952

2,585,487

UNITED STATES PATENT OFFICE 2,585,487

TOOLHOLDER

Dwight W. Moore, McKees Rocks, Pa.

Application April 25, 1950, Serial No. 157,865

3 Claims. (Cl. 29—96)

This invention relates to improvements in tool holders and particularly to tool holders which are used in conection with metal working apparatus such as lathes and planers.

It has been a problem in constructing tool holders of this type to provide one which is capable of fine adjustment and at the same time has the ability to withstand a large longitudinal force.

One object of the invention is to provide tool holders which contain the features of simple construction and design and therefore can be cheaply manufactured. A further object is to make a tool holder which can be made from relatively inexpensive grades of steel and at the same time furnish a rigid and tough tool holder capable of withstanding a large longitudinal thrust. Another object is to provide a tool holder which permits the user to enjoy maximum tool bit life. Another object of the invention is to provide a tool holder in which a tool bit can be easily and quickly adjusted to an advanced position or removed and replaced by a different bit. Another object is to furnish a tool holder which lends itself to fine adjustment. Additional objects of this invention will be apparent from a consideration of the following specification and accompanying drawings which describe and illustrate a preferred embodiment of my invention.

Figure 1:
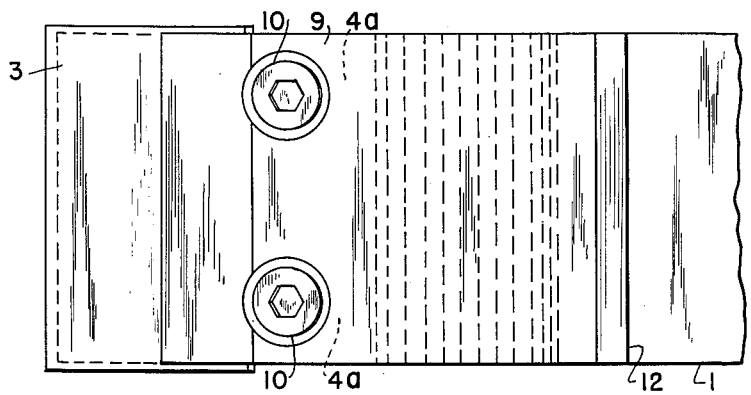
Figure 1 is a top plan view of the tool holder.
Figure 2:
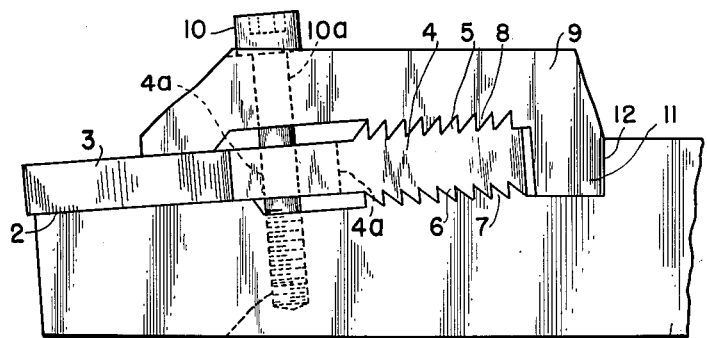
Figure 2 is a side elevation view of the invention with the tool bit and the back-up plate in the starting position.

The invention is characterized by serrations between the shank, back-up plate, and the clamp. The serrations may be of any desired shape. One form of serrations that is particularly suitable is the buttress type serrations or serrations having one vertical face. As shown in the accompanying drawings a shank 1, of any suitable cross-sectional shape, for convenient mounting on a metal working machine has a tool bit seat 2 adjacent one end thereof. Arranged on said shank for endwise abutment with a tool bit 3 is a back-up plate 4 with serrations 5 on one side and serrations 6 on the opposite side thereof. In Figure 2 the serrations 5 on the back-up plate 4 are complementary to serrations 7 on the shank 1, said serrations 7 being in the same plane as the tool bit seat 2. The serrations 6 on the back-up plate 4 are complementary to serrations 8 on a clamp 9. The clamp 9 is designed to hold the tool bit 3 firmly in position on the tool bit seat 2. As shown, bolts 10 extend through holes 10a in the clamp 9, slots 4a in the back-up plate 4 and into holes 1a in the shank 1. The rear end of the clamp 9 is formed with a downwardly extending portion 11 which abuts a shoulder 12 formed in the shank 1.

To remove the tool bit 3 from the tool holder, one need only to loosen the clamp 9.

To advance a tool bit 3 in respect to the tool holder, one need only to loosen the clamp 9 sufficiently to raise it so that the back-up plate 4 may be moved forward on the serrations.

Figure 3:
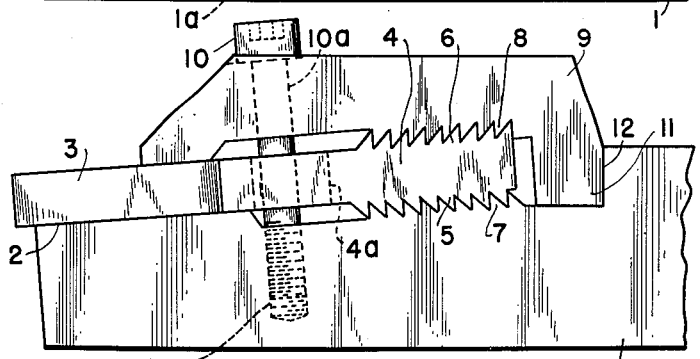
Figure 3 is a side elevation view of the invention with the tool bit and the back-up plate advanced one-half pitch.
Figure 4:
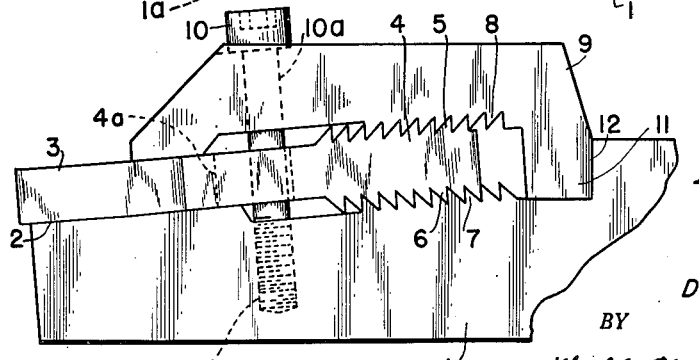
Figure 4 is a side elevation view of the tool holder with the tool bit and the back-up plate being considerably advanced.

One feature of my invention enables one to make a fine adjustment of the tool bit 3 forward or backward relative to the tool holder. This is accomplished by constructing the serrations 7 on the shank 1 one-half pitch forward or backward in respect to the serrations 8 on the clamp 9. Correspondingly the serrations 5 on one side of the back-up plate 4 are made one-half pitch forward or backward in respect to the serrations 6 on the opposite side of the back-up plate 4. To make an adjustment of a tool bit 3 one-half pitch forward or backward in respect to the tool holder, all that one needs to do is to loosen the clamp 9 sufficiently to enable one to lift the back-up plate 4 enough to rotate it 180° about its longitudinal axis and place it in the desired position—one-half pitch forward or backward in the tool holder. Figure 3 shows the tool bit 3 and back-up plate 4 advanced one-half pitch from the starting position shown in Figure 2. In Figure 3 the serrations 5 on the back-up plate 4 are complementary to the serrations 8 on the clamp 9 and correspondingly the serrations 6 on the back-up plate 4 are complementary to the serrations 7 on the shank 1; whereas in Figure 2 with the tool bit and the back-up plate one-half pitch backward in respect to Figure 3, the serrations 5 on the back-up plate 4 are complementary to the serrations 7 on the shank 1 and correspondingly the serrations 6 on the back-up plate 4 are complementary to the serrations 8 on the clamp 9. Figure 4 shows the tool bit and the back-up plate in a further advanced position in respect to the tool holder.

While certain structures embodying the invention have been shown and described, it will be understood that many changes in details of construction may be made without departing from the essence of the invention which is defined in the following claims.

I claim:

1. A tool holder comprising a shank having a tool bit seat adjacent one end thereof and having serrations adjacent the same end, an adjustable back-up plate arranged on said shank for endwise abutment of a tool bit, said back-up plate having on the top and bottom sides serrations which are advanced one with respect to the other one-half pitch, a clamp arranged on said shank for affixing said back-up plate and a tool bit to said shank, said clamp having serrations adjacent one end thereof, said serrations on said shank and said clamp being complementary to the serrations on said back-up plate, said serrations on the shank, back-up plate, and clamp being adapted for preventing longitudinal movement therebetween, and means for securing said clamp to said shank.

2. A tool holder comprising a shank having a tool bit seat adjacent one end thereof and having serrations adjacent the same end, an adjustable back-up plate arranged on said shank for endwise abutment of a tool bit, said back-up plate having serrations on the top and bottom sides, said serrations being complementary to the serrations on the shank, a clamp arranged on said shank for affixing said back-up plate and a tool bit to said shank, said clamp having serrations complementary to the serrations on the back-up plate, said serrations on the shank, back-up plate, and clamp being adapted for preventing longitudinal movement therebetween, said serrations on the shank being advanced one-half pitch with respect to said serrations on the clamp and correspondingly said serrations on one side of the back-up plate being advanced one-half pitch with respect to the serrations on the opposite side of said back-up plate, and means for securing said clamp to said shank.

3. A tool holder comprising a shank having a tool bit seat adjacent one end thereof and having serrations adjacent the same end, an adjustable back-up plate arranged on said shank for endwise abutment of a tool bit, said back-up plate having serrations on the top and bottom sides, said serrations being complementary to the serrations on the shank, a clamp arranged on said shank for affixing said back-up plate and a tool bit to said shank, said clamp having serrations complementary to the serrations on the back-up plate, said serrations on the shank, back-up plate, and clamp being adapted for preventing longitudinal movement therebetween, said serrations on the clamp being advanced one-half pitch with respect to said serrations on the shank and correspondingly said serrations on one side of the back-up plate being advanced one-half pitch with respect to the serrations on the opposite side of said back-up plate, and means for securing said clamp to said shank.

DWIGHT W. MOORE.

REFERENCES CITED

The following references are of record in the file of this patent:

UNITED STATES PATENTS

| Number | Name | Date |
|---|---|---|
| 717,601 | Normand | Jan. 6, 1903 |
| 2,293,999 | Redinger | Aug. 25, 1942 |

FOREIGN PATENTS

| Number | Country | Date |
|---|---|---|
| 428,789 | Great Britain | May 20, 1935 |
| 880,991 | France | Apr. 12, 1943 |